United States Patent [19]
Bauer et al.

[11] Patent Number: 6,039,353
[45] Date of Patent: Mar. 21, 2000

[54] APPARATUS FOR PRETENSIONING SEAT BELT WEBBING

[75] Inventors: Barney J. Bauer, Fenton; Arnold J. Herberg, Davisburg, both of Mich.

[73] Assignee: TRW Vehicle Safety Systems Inc., Lyndhurst, Ohio

[21] Appl. No.: 08/998,240

[22] Filed: Dec. 24, 1997

[51] Int. Cl.⁷ .................................................. B60R 22/46
[52] U.S. Cl. .......................... 280/806; 297/480; 297/472; 188/374
[58] Field of Search ..................................... 280/806, 805; 297/480, 470, 471, 472; 188/374, 371

[56] References Cited

U.S. PATENT DOCUMENTS

| | | | |
|---|---|---|---|
| 4,441,738 | 4/1984 | Tsuge et al. | 280/806 |
| 5,350,194 | 9/1994 | Fohl | 280/805 |
| 5,407,148 | 4/1995 | Ono et al. . | |
| 5,871,236 | 2/1999 | Bauer et al. | 280/806 |
| 5,873,599 | 2/1999 | Bauer et al. | 280/806 |

OTHER PUBLICATIONS

U.S. Patent Appln. Serial No. 08/855,412, filed May 13, 1997, entitled "Apparatus for Seat Belt Webbing".
U.S. Patent Appln. Serial No. 08/855,343, filed May 13, 1997, entitled "Apparatus for Seat Belt Webbing".

*Primary Examiner*—Paul N. Dickson
*Attorney, Agent, or Firm*—Tarolli, Sundheim, Covell, Tummino & Szabo L.L.P.

[57] ABSTRACT

An apparatus (40) pretensions seat belt webbing (16) which is extensible about an occupant of a vehicle seat (14). The apparatus (40) includes a movable first member (140), a connector (42) for connecting the first member (140) with the seat belt webbing (16), a movable second member (200), a pyrotechnic device (120) for applying a force to the second member (200) to move the second member, and force limiting coupling device (240). The force limiting coupling device (240) couples the first member (140) and the second member (200). The coupling device (240) moves the first member (140) with the second member (200) until a predetermined force is applied by the connector (42) to the first member (140) resisting movement of the first member with the second member. Thereafter, the coupling device (240) enables the second member to move relative to the first member.

8 Claims, 5 Drawing Sheets

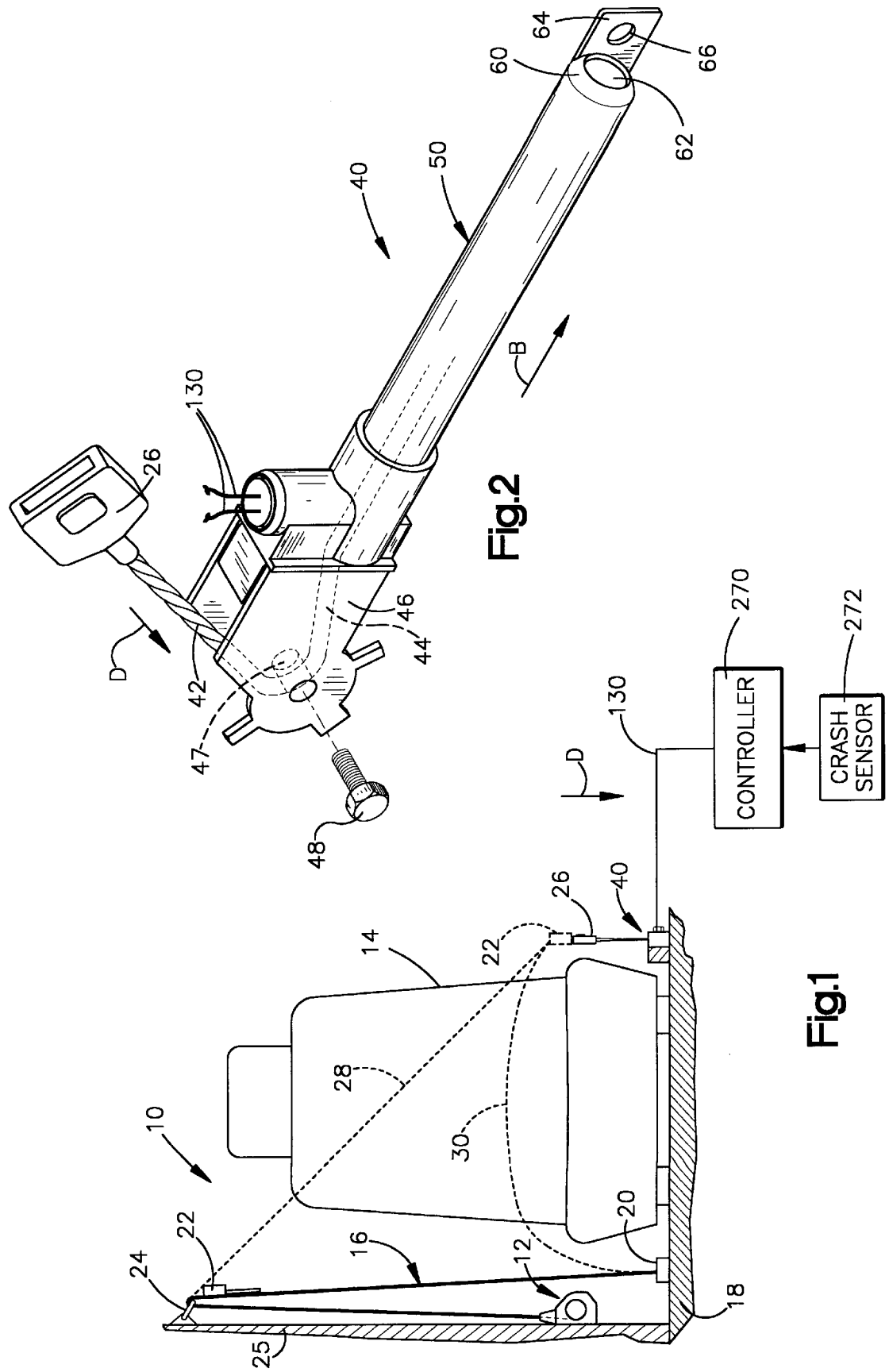

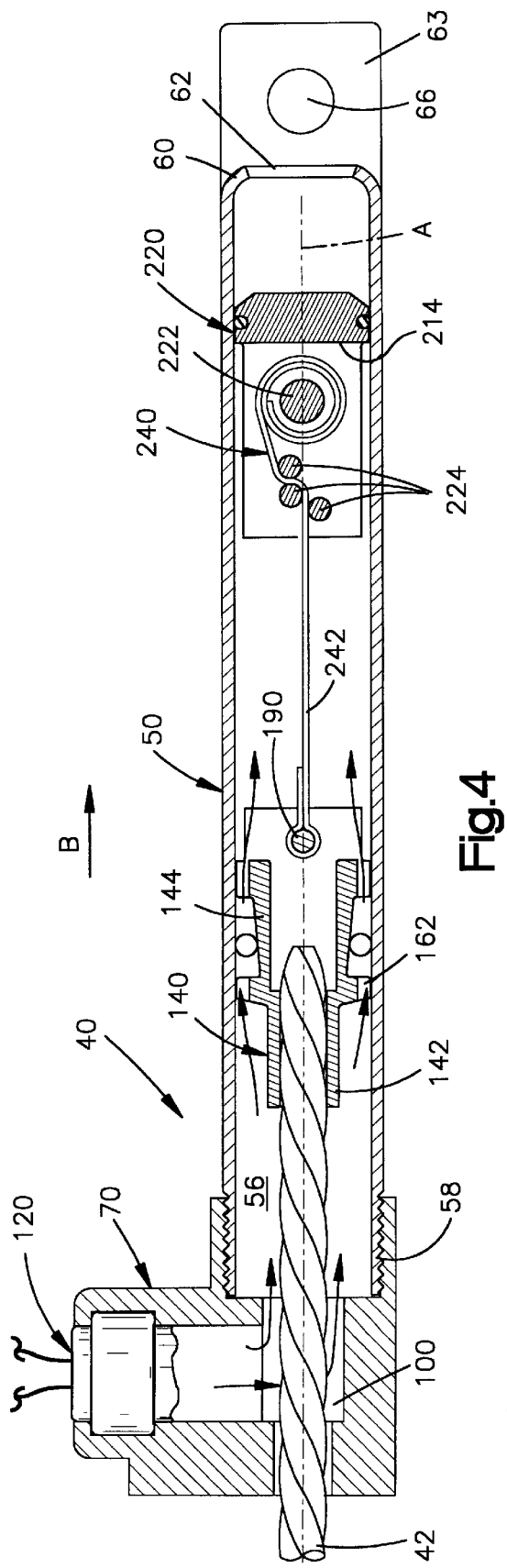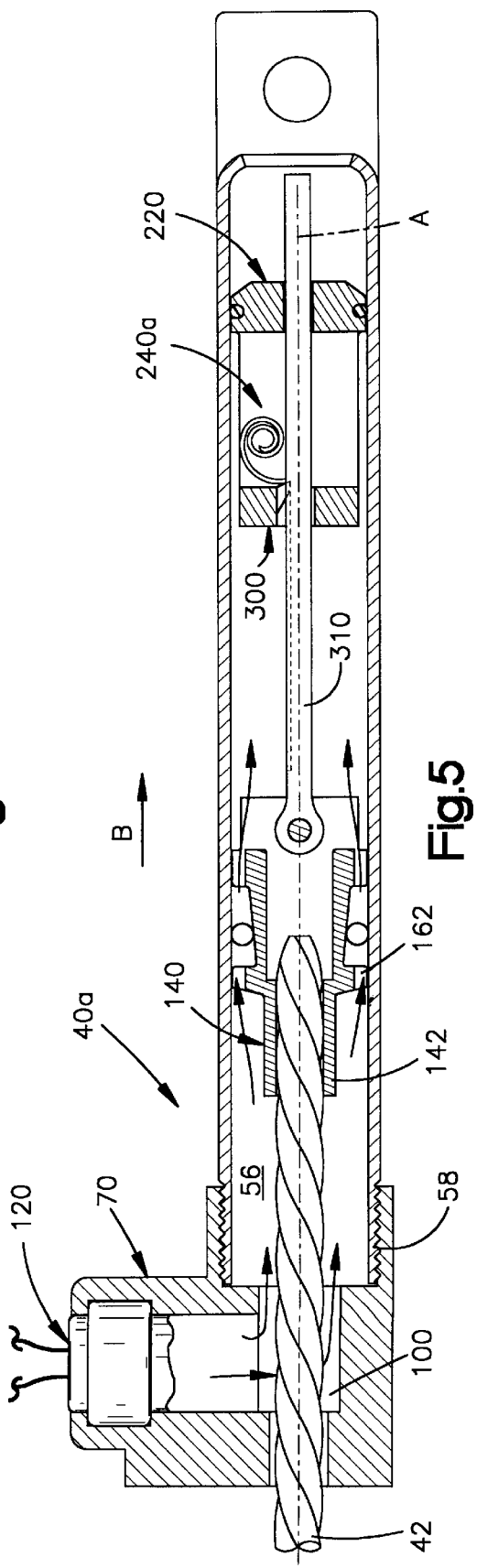

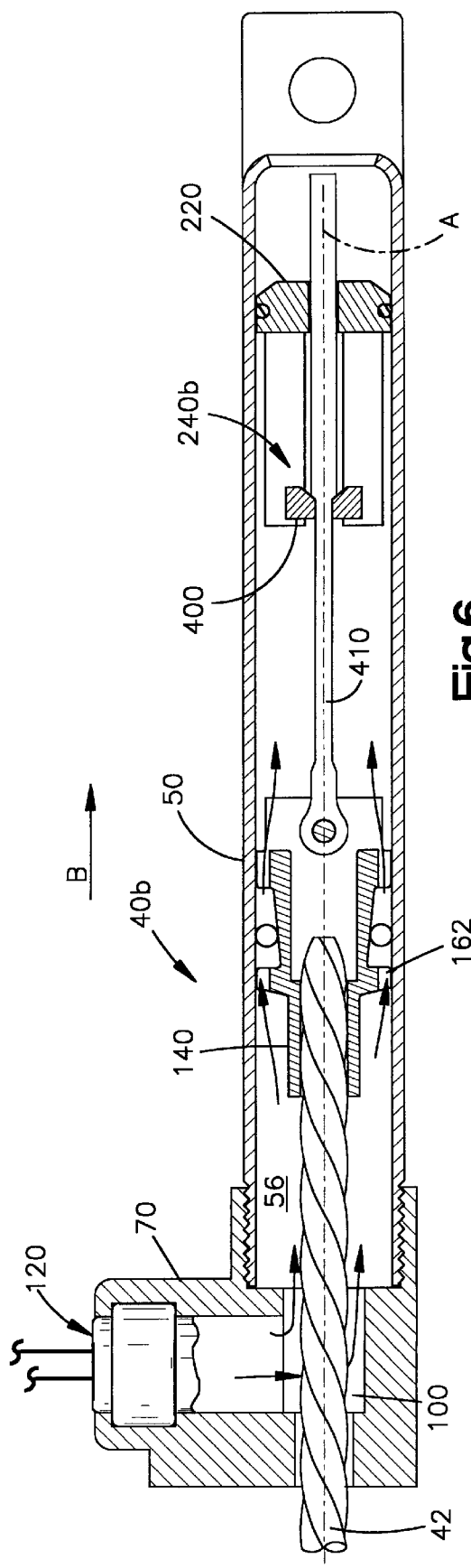
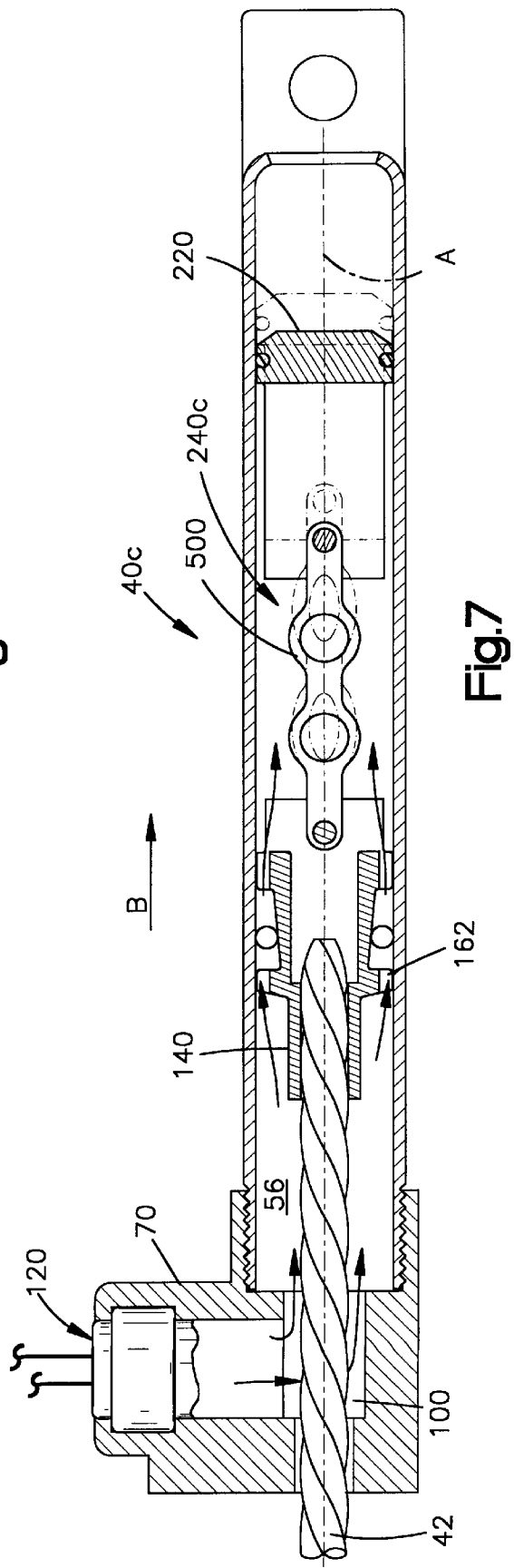

APPARATUS FOR PRETENSIONING SEAT BELT WEBBING

BACKGROUND OF THE INVENTION

1. Technical Field

The present invention relates to an apparatus for pretensioning seat belt webbing which is extensible about an occupant of a vehicle seat.

2. Description of the Prior Art

It is known to pretension seat belt webbing in the event of a vehicle collision. In one known seat belt webbing system, the seat belt webbing is pretensioned by moving a buckle associated with the seat belt webbing through a pretensioning stroke. The pretensioning stroke is accomplished by actuating a pyrotechnic charge in a piston/cylinder device.

It is characteristic of the known pretensioning devices that the final pretensioning force which is applied to the occupant (due to tension in the seat belt webbing) is dependent on the amount of slack in the seat belt webbing which is removed during the pretensioning stroke. The amount of slack in the seat belt webbing varies with the size and shape of the occupant of the seat as well as with the type of clothing worn by the occupant and the design of the vehicle seat. Due to an inherently fast pressure drop in the pretensioner cylinder after actuation of the pyrotechnic charge and the variation in the amount of slack in the webbing, the amount of the final pretensioning force can vary for occupants of different sizes and shapes.

SUMMARY OF THE INVENTION

The present invention is an apparatus for pretensioning seat belt webbing which is extensible about an occupant of a vehicle seat. The apparatus comprises a movable first member, connecting means for connecting the first member with the seat belt webbing, and a movable second member. The apparatus also includes means for applying a force to the second member to move the second member. The apparatus further includes force limiting coupling means for coupling the first member and the second member and for moving the first member with the second member. Such movement occurs until a predetermined force is applied by the connecting means to the first member resisting movement of the first member with the second member. Thereafter, the coupling means enables the second member to move relative to the first member.

The means for applying a force preferably comprises a pyrotechnic device for generating gas to act on the second member to effect movement of the second member. The apparatus further preferably comprises a housing having a chamber. The first member comprises a first piston in the chamber. The second member comprises a second piston in the chamber.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system including an apparatus for pretensioning seat belt webbing constructed in accordance with the present invention;

FIG. 2 is a perspective view of a portion of the pretensioner apparatus of FIG. 1;

FIG. 4 is a sectional view showing the pretensioner apparatus of FIG. 3 in an actuated condition;

FIG. 5 is a view similar to FIG. 4 illustrating a second embodiment of a pretensioner apparatus in an actuated condition;

FIG. 6 is a view similar to FIG. 4 illustrating a third embodiment of a pretensioner apparatus in an actuated condition;

FIG. 7 is a view similar to FIG. 4 illustrating a fourth embodiment of a pretensioner apparatus.

DESCRIPTION OF PREFERRED EMBODIMENTS

Figure 3:
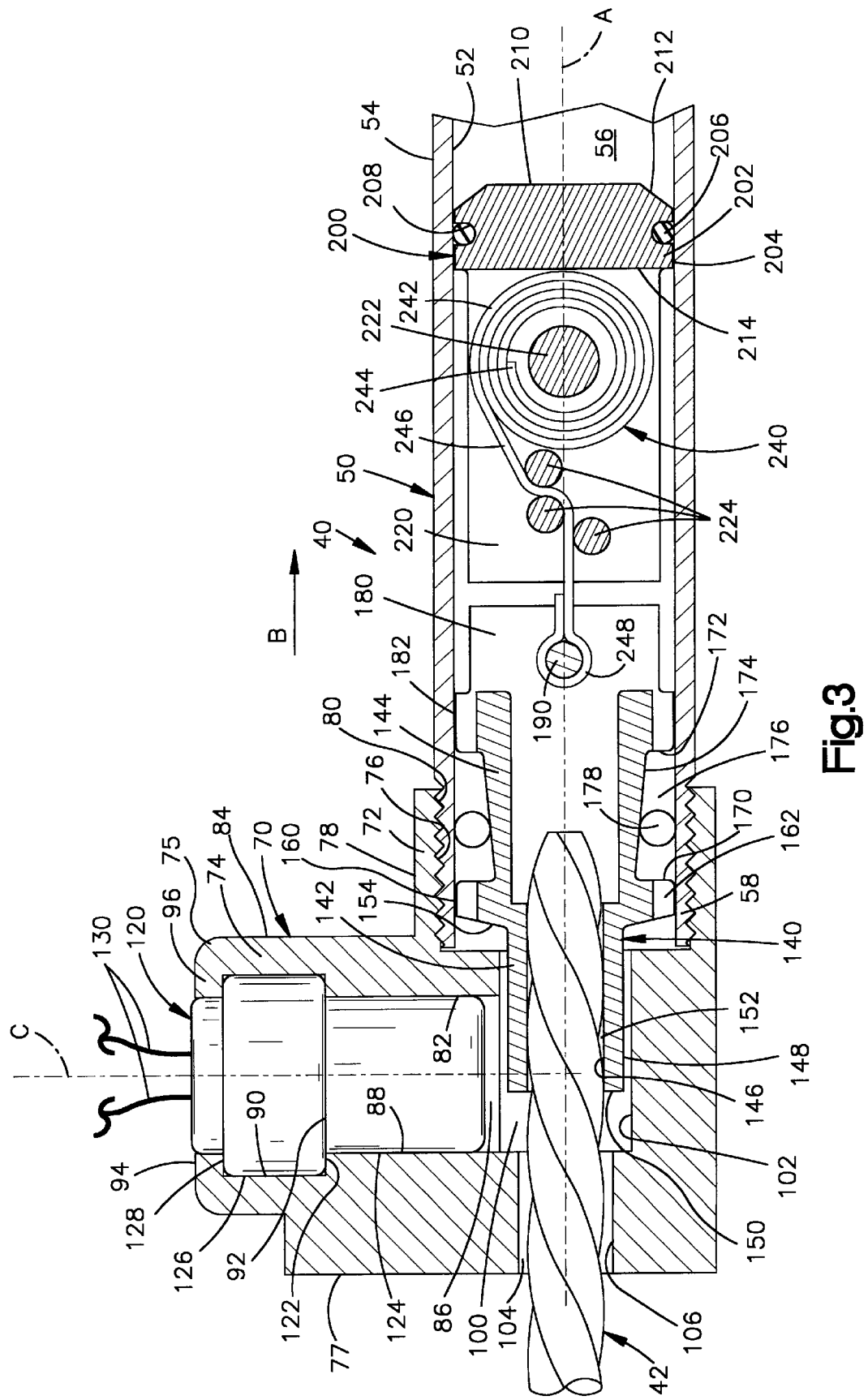
FIG. 3 is a partial sectional view of a portion of the pretensioner apparatus of FIG. 2 in an unactuated condition.

The present invention relates to an apparatus for pretensioning seat belt webbing which is extensible about an occupant of a vehicle seat. The present invention is applicable to seat belt systems of various constructions. As representative of the present invention, FIG. 1 illustrates a three-point continuous loop seat belt system 10 for use in restraining an occupant of a vehicle.

The occupant of the vehicle sits on a vehicle seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 12 which is secured to the vehicle body 18 on the same side of the seat 14. Intermediate its ends, the belt webbing 16 passes through a tongue assembly 22 and a D-ring 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

The seat belt system 10 includes a pretensioner apparatus 40 which is operable to remove slack from the seat belt webbing 16 and to tension the seat belt webbing in the event of sudden vehicle deceleration such as occurs in a vehicle collision. The pretensioner apparatus 40 (FIG. 2) includes a cable 42, one end of which is fixedly connected to the seat belt buckle 26. A middle portion 44 of the cable 42 extends through an anchor bracket 46 and slidingly engages a cylindrical spacer 47 in the anchor bracket. The anchor bracket 46 is secured to the vehicle body 18 by a bolt 48 which extends through the spacer 47.

The pretensioner apparatus 40 includes a cylindrical housing 50 and an end cap 70. The housing 50 is centered on an axis A and has parallel inner and outer surfaces 52 and 54, respectively (FIG. 3). The inner surface 52 defines a cylindrical chamber 56 in the housing 50. The housing 50 includes a first end portion 58 and a second end portion 60 having an open end 62 (FIG. 4). The outer surface 54 of the housing 50 at the first end portion 58 is threaded.

A planar mounting flange 64 extends from the second end 60 of the housing 50. The mounting flange 64 has a centrally located opening 66 for receiving a bolt (not shown) to secure the housing to the vehicle body 18. The housing 50 is shown oriented horizontally in FIG. 1, but the housing could be oriented vertically or at an angle between horizontal and vertical.

The end cap 70 has an L-shaped cross-section formed by first and second portions 72 and 74, respectively, which are perpendicular to one another (FIG. 3). The first portion 72 of the end cap 70 is cylindrical and is centered on the axis A. The first end portion 72 has parallel inner and outer surfaces 76 and 78, respectively. A first surface portion 80 of the inner surface 76 is threaded to match the threads on the outer surface 54 of the first end portion 58 of the housing 50.

The second portion 74 of the end cap 70 includes a cylindrical main body portion 75 and a planar flange portion 77 welded to the main body portion. The flange portion 77 is secured to the mounting bracket 46 by fasteners (not shown). The main body portion 75 of the second portion 74 is centered on an axis C and has inner and outer surfaces 82 and 84, respectively. The inner surface 82 defines a chamber 86 in the main body portion 75 of the second portion 74 of the end cap 70. The inner surface 82 includes an axially extending first surface portion 88 and an axially extending second surface portion 90. The first and second surface portions 88 and 90 are connected by a radially extending third surface portion 92. A terminal end portion 94 of the main body portion 75 of the second portion 74 of the end cap 70 forms a crimpable flange 96.

An L-shaped combustion chamber 100 is formed in the end cap 70. The L-shaped combustion chamber 100 is defined by a first annular surface 102 in the first portion 72 of the end cap 70 which is parallel to the axis A and which intersects the first surface portion 88 in the second portion 74 of the end cap. The combustion chamber 100 is in fluid communication with the chamber 86 in the end cap 70 and the chamber 56 in the housing 50.

The end cap 70 further includes an axial passage 104 centered on the axis A and defined by a second annular surface 106. The axial passage 104 is in fluid communication with the combustion chamber 100 in the end cap 70. A portion of the cable 42 extends through the axial passage 104 in the end cap 70.

The pretensioner apparatus 40 includes a pyrotechnic device 120 located in the chamber 86 in the second portion 74 of the end cap 70. The pyrotechnic device 120 includes a radially extending first surface 122 which abuts the radially extending third surface portion 92 in the chamber 86 in the end cap 70. Axially extending second and third surfaces 124 and 126, respectively, of the pyrotechnic device 120 abut the axially extending first and second surfaces 88 and 90, respectively, in the chamber 86 in the end cap 70. The crimpable flange 96 of the end cap 70 crimps over a radially extending fourth surface 128 of the pyrotechnic device 120 to secure the device in the chamber 86.

The pyrotechnic device 120 includes a material which, when actuated by a flow of electric current, ignites and combusts to form a gas which increases the pressure in the chambers 86 and 100 in the end cap 70. The pyrotechnic device 120 is electrically actuatable over lead wires 130. The pyrotechnic device 120 has an extremely high output capacity. Preferably, the pyrotechnic device 120 is able to produce twice the amount of pretensioning force required.

The pretensioner apparatus 40 further includes first and second pistons 140 and 200, respectively, in the chamber 56 in the housing 50. The first piston 140 is annular in shape and is centered on the axis A. The first piston 140 has first and second portions 142 and 144, respectively. The first portion 142 of the first piston 140 has parallel inner and outer surfaces 146 and 148, respectively. A radially extending end surface 150 of the first portion 142 interconnects the inner and outer surfaces 146 and 148, respectively. The inner surface 146 defines a passage 152 centered on axis A and which extends through the first portion 142 of the first piston 140. The passage 152 through the first portion 142 of the first piston 140 has a diameter which is approximately equal to the diameter of the passage 104 in the end cap 70. A portion of the cable 42 extends through the passage 152 in the first piston 140 and is connected to the first piston in a known manner (not shown).

An oblique surface 154 extends between the first portion 142 of the first piston 140 and the second portion 144 of the first piston. The second portion 144 of the first piston 140 has a cylindrical outer surface 160 which slidingly engages the inner surface 52 of the housing 50. Multiple circumferentially spaced and axially extending slots 162 are disposed about the periphery of the second portion 144 adjacent the oblique surface 154.

Adjacent the plurality of slots 162, first and second surfaces 170 and 172, respectively, in the second portion 144 of the first piston 140 extend parallel to one another and radially inward from the outer surface 160. The first and second surfaces 170 and 172 are connected by a frustoconical third surface 174. The first surface 170, the second surface 172, and the third surface 174 together define an annular groove 176 in the second portion 144 of the first piston 140. Anti-pullback lock balls 178 are disposed in the annular groove 176 for permitting movement of the first piston 140 in a direction indicated by arrow B (to the right as viewed in FIGS. 3 and 4) and for preventing movement of the piston in an opposite direction (to the left as viewed in FIGS. 3 and 4).

The second portion 144 of the first piston 140 further includes a pair of planar walls 180 extending axially toward the second end 60 of the housing 50. The walls 180, one of which is shown in FIG. 3, are preferably formed in one piece with the first piston 140. An outer surface 182 of each of the walls 180 slidingly engages the inner surface 52 of the housing 50. The walls 180 are parallel to one another and are spaced apart. A cylindrical pin 190 extends between the walls 180.

The second piston 200 is located between the first piston 140 and the second end portion 60 of the housing 50. The second piston 200 includes an annular base portion 202 centered on the axis A. The base portion 202 of the second piston 200 has a cylindrical outer surface 204 in sliding engagement with the inner surface 52 of the housing 50. An annular seal 206 is located in an annular groove 208 in the outer surface 204 of the base portion 202 of the second piston 200.

A radially extending first end surface 210 of the second piston 200 faces the second end portion 60 of the housing 50. A chamfered surface 212 connects the first end surface 210 of the second piston 200 to the outer surface 204. A radially extending second end surface 214 of the second piston 200 faces the first piston 140.

The second piston 200 further includes a pair of spaced apart, axially extending wall portions 220. The wall portions 220, one of which is shown in FIG. 3, extend in parallel from the second end surface 214 toward the first piston 140. A cylindrical rod 222 extends between the wall portions 220 adjacent the second end surface 214 of the second piston 200. A plurality of deformation pins 224 also extends between wall portions 220 of the second piston 200. The deformation pins 224 preferably are located and spaced as shown in the Figures.

The pretensioner apparatus 40 includes a force limiting device 240 comprising a planar metal band 242. The band 242 has a first portion 244 which is rolled around the cylindrical rod 222 in the second piston 200. An intermediate portion 246 of the band 242 extends along a path through the deformation pins 224 and frictionally engages each of the pins. The band 242 has a second end portion 248 which is wrapped around the pin 190 in the first piston 140. The second end portion 248 of the band 242 is secured to itself by welding or other such means.

The pretensioner apparatus 40 (FIG. 1) includes a system controller 270 mounted in the vehicle. The system controller 270 is electrically connected to the pyrotechnic device 120 by the lead wires 130. The system controller 270 preferably comprises a microcomputer or microprocessor. A crash sensor 272 mounted on the vehicle body 18 is also electrically connected to the system controller 270. The crash sensor 272 senses one or more conditions indicative of a vehicle collision, such as sudden vehicle deceleration.

The second piston 200 of the pretensioner apparatus 40 is movable between first, second, and third positions in the chamber 56 in the housing 50. The first position for the second piston 200 is near the first end portion 58 of the housing 50. The second position for the second piston 200 is intermediate the first and second end portions 58 and 60, respectively, of the housing 50. The third position for the second piston 200 is near the second end portion 60 of the housing 50.

The first piston 140 of the pretensioner apparatus 40 is movable between fourth and fifth positions in the chamber 56 in the housing 50. In the fourth position, the first piston 140 is adjacent the second piston 200 when the second piston is in the first position. In the fifth position, the first piston 140 is adjacent the second piston 200 when the second piston is in the second position. The first piston 140 remains in the fifth position and thus is spaced from the second piston 200 when the second piston is in the third position.

Under normal driving conditions, the seat belt buckle 26 and the cable 42 are in the positions shown in FIG. 2. The cable 42 interconnecting the first piston 140 and the buckle 26 is taut.

Further, under normal conditions, the second piston 200 is in the first position in the chamber 56 near the first end portion 58 of the housing 60 (FIG. 3). The first piston 140 is in the fourth position adjacent the second piston 200. Thus, in the fourth position, the first piston 140 is axially between the second piston 200 and the first end portion 58 of the housing 50.

In the event of sudden vehicle deceleration such as occurs in a collision, the crash sensor 272 sends a collision detection signal to the system controller 270. The pyrotechnic device 120 is actuated by an electric signal from the system controller 270 over the lead wires 130.

When the pyrotechnic device 120 is actuated, the resulting combustion products of the pyrotechnic device rapidly produce a significant increase in pressure inside the chambers 86 and 100 in the end cap 70. The increase in pressure in the chamber 100 increases the pressure in the chamber 56 in the housing 50. The increased fluid pressure in the chamber 56 passes through the slots 162 in the first piston 140, around the walls 180 of the first piston 140, and applies force against the second end surface 214 of the base portion 202 of the second piston 200. The force against the second end surface 214 causes the second piston 200 to move in the direction of arrow B. Due to the connection that the band 242 forms between the second piston 200 and the first piston 140, the first piston is also moved by the force applied against the second piston.

Under the force generated by the pyrotechnic device 120, the first and second pistons 140 and 200 are moved from the respective fourth and first positions shown in FIG. 3 toward the respective fifth and second positions illustrated in FIG. 4.

As the second piston 200 moves toward the fourth position in the chamber 56 in the housing 50, the cable 42 is pulled along with the piston. This pulling of the cable 42 causes the seat belt buckle 26, to which one end of the cable is connected, to be pulled generally downward, in a direction indicated by arrow D (FIGS. 1 and 2). The generally downward movement of the seat belt buckle 26 pulls the tongue assembly 22 generally downward, thereby removing any slack in the seat belt webbing 16 and tensioning the belt webbing.

At some point after the first and second pistons 140 and 200 have begun moving toward their respective fifth and second positions, a counter force acting on the first piston 140 due to tension in the cable 260 reaches a predetermined amount. Preferably, the predetermined force level is approximately 2.5 KN. After the predetermined force level is reached, additional force on the second piston 200 due to the earlier actuation of the pyrotechnic device 120 continues to move the second piston in the direction of arrow B while the first piston 140 remains stationary.

This movement of the second piston 200 relative to the first piston 140 takes place because the band 242 interconnecting the first and second pistons begins to unroll. The unrolled portion is deformed by passing between the deformation pins 224. The deformation of the unrolled portion of the band 242 by the pins 224 limits the force applied by the pyrotechnic device 120. Ultimately, the force generated by the pyrotechnic device 120 is limited to a predetermined force level by deformation of the band 242 as it unrolls to allow the relative movement of the second piston 200. The second piston 200 at the end of the pretensioning process is in the third position near the second end portion 60 of the housing 50.

The pretensioner apparatus 40 described above provides a pretensioning force which is approximately constant for all occupants. Regardless of the size and shape of a particular vehicle seat occupant, the force generated by the pyrotechnic device 120 takes up any slack in the belt webbing 16 and then pretensions the belt webbing up to a predetermined level. The high output capacity of the pyrotechnic device 120 ensures that there will be sufficient force to accomplish both these functions. The deformable metal band 242 allows the second piston 200 to slip relative to the first piston 140 upon reaching the predetermined force level on the cable 42 so that the tension in the seat belt webbing 16 does not exceed a predetermined design value.

FIG. 5 illustrates a second embodiment of a pretensioner apparatus 40a constructed in accordance with the present invention. In FIG. 5, reference numbers identical to those of the embodiment of FIGS. 1–4 are used to designate parts which are identical to the parts of the embodiment of FIGS. 1–4.

The pretensioner apparatus 40a includes a force limiting device 240a comprising a metal cutter 300 formed in the second piston 200 and a metal rod 310 interconnecting the first and second pistons 140 and 200. The metal cutter 300 shears metal from the rod 310 during movement of the second piston 200 relative to the first piston 140 to dissipate the force on the second piston.

FIG. 6 illustrates a third embodiment of a pretensioner apparatus 40b constructed in accordance with the present invention. In FIG. 6, reference numbers identical to those of the embodiment of FIGS. 1–4 are used to designate parts which are identical to the parts of the embodiment of FIGS. 1–4.

The pretensioner apparatus 40b includes a force limiting device 240b comprising a necking die 400 formed in the second piston 200 and a metal rod 410 interconnecting the first and second pistons 140 and 200. The necking die 400 extrudes the metal of the rod 410 during movement of the second piston 200 relative to the first piston 140 to dissipate the force on the second piston.

FIG. 7 illustrates a fourth embodiment of a pretensioner apparatus 40c constructed in accordance with the present invention. In FIG. 7, reference numbers identical to those of the embodiment of FIGS. 1–4 are used to designate parts which are identical to the parts of the embodiment of FIGS. 1–4.

The pretensioner apparatus 40c includes a force limiting device 240c comprising a metal elongation member 500 interconnecting the first and second pistons 140 and 200. The metal elongation member 500 elongates, as indicated in dashed lines in FIG. 7, during movement of the second piston relative to the first piston 140 to dissipate the force on the second piston.

Figure 8:
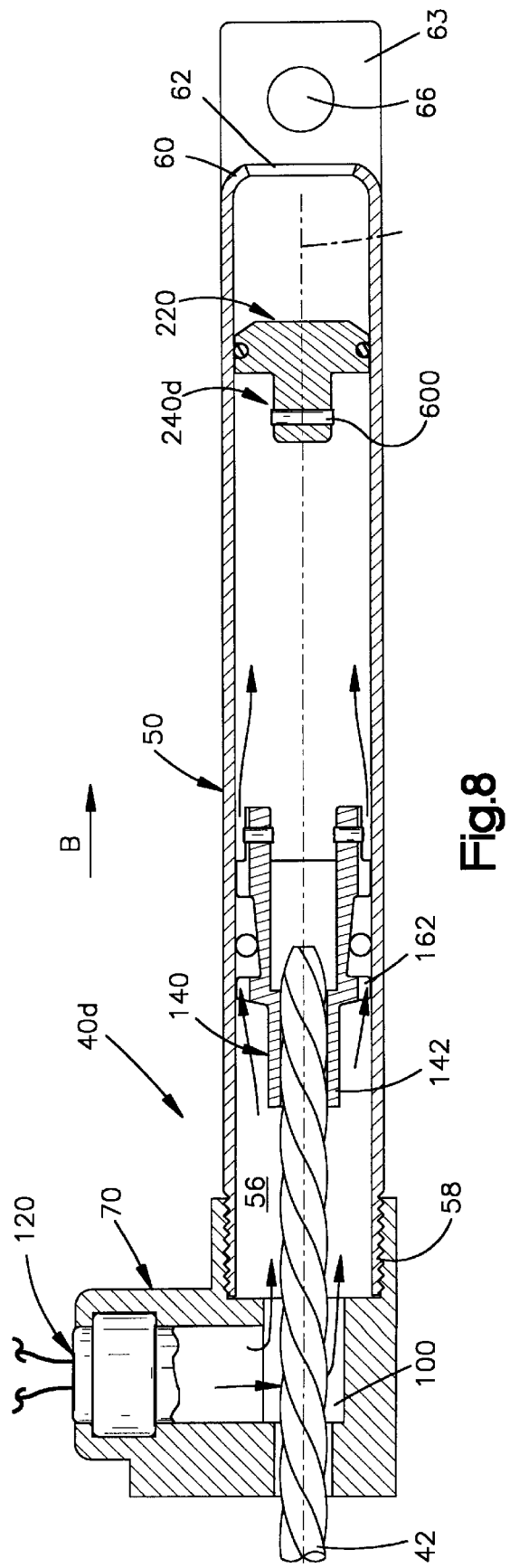
FIG. 8 is a view similar to FIG. 4 illustrating a fifth embodiment of a pretensioner apparatus.

FIG. 8 illustrates a fifth embodiment of a pretensioner apparatus 40d constructed in accordance with the present invention. In FIG. 8, reference numbers identical to those of the embodiment of FIGS. 1–4 are used to designate parts which are identical to the parts of the embodiment of FIGS. 1–4.

The pretensioner apparatus 40d includes a force limiting device 240d comprising a shear pin 600 interconnecting the first and second pistons 140 and 200. The shear pin 600 shears when the force on the second piston 200 reaches a predetermined level to allow movement of the second piston relative to the first piston 140.

From the above description of the invention, those skilled in the art will perceive improvements, changes and modifications in the invention. For example, the pretensioner apparatus 40 could also be applied as a retractor-mounted system, rather than the seat belt buckle-mounted system described above. Such improvements, changes and modifications within the skill in the art are intended to be covered by the appended claims.

Having described the invention, we claim:

1. An apparatus for pretensioning seat belt webbing which is extensible about an occupant of a vehicle seat, said apparatus comprising:

a movable first member;

connecting means for connecting said first member with the seat belt webbing;

a movable second member;

means for applying a force to said second member to move said second member, said first member being positioned axially between said second member and said means for applying a force to said second member;

force limiting coupling means for coupling said first member and said second member and for moving said first member with said second member until a predetermined force is applied by said connecting means to said first member resisting movement of said first member with said second member and for thereafter enabling said second member to move relative to said first member.

2. An apparatus as defined in claim 1 wherein said means for applying a force comprises a pyrotechnic device for generating gas to act on said second member to effect movement of said second member, said gas generated by said pyrotechnic device flowing around and through said first member to apply force on said second member.

3. The apparatus as defined in claim 1 further comprising a housing having a chamber, said first member comprising a first piston in said chamber.

4. The apparatus as defined in claim 3 wherein said second member comprises a second piston in said chamber.

5. An apparatus as defined in claim 4 wherein said means for applying a force comprises an actuatable pyrotechnic device for increasing pressure in said chamber acting on said second piston to initially effect movement of said first and second pistons in said chamber and to subsequently effect movement of said second piston in said chamber relative to said first piston.

6. The apparatus as defined in claim 5 further comprising control means operatively connected to said pyrotechnic device for controlling the actuation of said pyrotechnic device.

7. The apparatus as defined in claim 1 wherein said force limiting coupling means comprises a device for deforming material.

8. An apparatus for pretensioning seat belt webbing which is extensible about an occupant of a vehicle seat, said apparatus comprising:

a housing having first and second ends and a chamber between said ends;

a movable first member in said chamber;

connecting means for connecting said first member with the seat belt webbing;

a movable second member in said chamber, said second member being movable from a first position near said first end of said housing to a second position intermediate said ends of said housing, said second member being further movable to a third position near said second end of said housing;

means for applying a force to said second member to move said second member from said first position to said second position and from said second position to said third position, said means for applying a force being located adjacent said first end of said housing, said first member being positioned in-between said second member and said means for applying a force; and force limiting coupling means for coupling said first member and said second member, said first member having a fourth position adjacent said second member when said first member is in said first position;

said force limiting coupling means moving said first member along with said second member toward a fifth position in said chamber when said second member is moving toward said second position until a predetermined force is applied by said connecting means to said first member resisting further movement of said first member with said second member, thereafter said force limiting coupling means enabling said second member to move relative to said first member toward said third position.

* * * * *